United States Patent
Liu et al.

(10) Patent No.: US 7,885,343 B2
(45) Date of Patent: Feb. 8, 2011

(54) DEVICE AND METHOD FOR CLIPPING MULTICARRIER SIGNAL

(75) Inventors: Jianhua Liu, Guangdong (CN); Qixiang Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1007 days.

(21) Appl. No.: 11/674,202

(22) Filed: Feb. 13, 2007

(65) Prior Publication Data

US 2007/0201567 A1    Aug. 30, 2007

Related U.S. Application Data

(63) Continuation of application No. PCT/CN2006/000209, filed on Feb. 9, 2006.

(30) Foreign Application Priority Data

May 27, 2005 (CN) ........................ 2005 1 0073026

(51) Int. Cl.
 *H04L 27/28* (2006.01)
(52) U.S. Cl. ........................ 375/260; 375/316; 375/350
(58) Field of Classification Search ................. 375/260, 375/316, 222, 350
See application file for complete search history.

(56) References Cited

U.S. PATENT DOCUMENTS 6,052,411 A * 4/2000 Mueller et al. .............. 375/222
2004/0224715 A1 * 11/2004 Rosenlof et al. ............ 455/522
2005/0063036 A1 * 3/2005 Bechtel et al. .............. 359/275
2005/0141381 A1 * 6/2005 Chen et al. ............... 369/53.24

FOREIGN PATENT DOCUMENTS

| CN | 1389035 | 1/2003 |
| WO | WO 99/49635 | 9/1999 |

OTHER PUBLICATIONS

Jean Armstrong; "New OFDM Peak-to-Average Power Reduction Scheme"; IEEE 53$^{RD}$ Vehicular Technology Conference Held in Rhodes, Greece, vol. 1 of 4, May 6, 2001.

* cited by examiner

*Primary Examiner*—Mohammad H Ghaynour
*Assistant Examiner*—Leila Malek
(74) *Attorney, Agent, or Firm*—Finnegan, Henderson, Farabow, Garret & Dunner LLP

(57) ABSTRACT

A device and a method for clipping multicarrier signal are provided. The method for clipping multicarrier signal includes: detecting whether an Idle Period in DownLink (IPDL) starts in each subcarrier forming a multicarrier joint signal and generating an IPDL flag just when the IPDL starts in a subcarrier; detecting power of each subcarrier to get a detection result; selecting a clipping filter coefficient according to the IPDL flag and the detection result; performing a clipping processing of the received multicarrier joint signal according to the clipping filter coefficient and outputting the multicarrier joint signal after the clipping processing. Embodiments of the present invention meet demands of an IPDL time template and effectively support an IPDL mechanism in a Wideband Code Division Multiple Access (WCDMA) system on the premise of no multicarrier signal clipping performance is affected.

8 Claims, 4 Drawing Sheets

DEVICE AND METHOD FOR CLIPPING MULTICARRIER SIGNAL

FIELD OF THE TECHNOLOGY

The present invention relates to signal processing in a multicarrier communication system, and particularly to a device and a method for clipping multicarrier signal.

BACKGROUND OF THE INVENTION

In a mobile communication system, a multicarrier technology has fully grown and developed gradually in recent years. Since a multicarrier clipping technology may reduce a peak to average rate of a multicarrier signal so as to raise efficiency of a high power amplifier and cut the cost of power amplification equipment. For this reason, the multicarrier clipping technology has seen used more and more.

A multicarrier clipping technique based on a multi-band bandpass filter and a filter coefficient selection has been proposed in the prior art with two embodiments adopting a real coefficient filtering and a complex coefficient filtering respectively. As shown in FIG. 1a, a multicarrier signal clipping device 60 adopting a real coefficient filtering in the above-mentioned application document includes a noise generation unit 600, a positive frequency shift unit 601, an amplitude prediction unit 602, a noise amplitude adjustment unit 603, a wideband noise frequency shift processing unit 604, a reverse frequency shift unit 605, a lowpass filtering unit 606, a peak value counteracting unit 607, a clipping filter selection unit 608, and a subcarrier power detection unit 609, and the noise generation unit 600 includes a squarer 6001, a squarer 6002 and a noise generator 6003.

In the multicarrier clipping structure 60, the noise generation unit 600 first receives an intermediate frequency multicarrier joint signal to generate a clipped noise, then sends the clipped noise to the positive frequency shift unit 601, and the positive frequency shift unit 601 moves the clipped noise received to a positive frequency section to get a positive clipped noise. Meanwhile, the subcarrier power detection unit 609 detects the magnitude of each subcarrier power, calculates the power to see if it falls, and further calculates magnitude of the falling if the power falls; the clipping filter selection unit 608 selects an appropriate clipping filer coefficient according to the power information from the subcarrier power detection unit and sends the selected coefficient to the wideband noise frequency shift processing unit 604 and the amplitude prediction unit 602; the wideband noise frequency shift processing unit 604 updates the filter coefficient according to these coefficients. Then, the positive frequency clipped noise is simultaneously sent to the amplitude prediction unit 602 and the noise amplitude adjustment unit 603. The amplitude prediction unit 602 makes a prediction for the amplitude of the positive frequency clipped noise which passes an actual clipping filter and then sends the predicted value to the noise amplitude adjustment unit 603. The noise amplitude adjustment unit 603 performs an amplitude adjustment for the clipped noise according to the predicted value to enable the peak value of the adjusted signal after being filtered to be closer to the positive frequency clipped noise before the adjustment. The wideband noise frequency shift processing unit 604 receives the noise signal after the amplitude adjustment and shapes the spectrum thereof to bring enough suppression to a transition band and a block band of the spectrum thereof, and then the reverse frequency shift unit 605 moves the noise signal from the wideband noise frequency shift processing unit 604 back to the original frequency section. The filtering noise after being reversely frequency shifted then re-passes the lowpass filtering unit 606 to filter the unnecessary negative frequency noise component; eventually a peak value counteracting is performed for the original multicarrier joint signal in the peak value counteracting unit 607, in other words, the noise signal after being processed with the amplitude adjustment and the spectrum shaping is imposed on the original and postponed multicarrier joint signal so as to get the peak value of the original multicarrier joint signal well suppressed. This technique makes a selection of the clipping filter coefficient according to the subcarrier power so as to prevent such indexes as a small power carrier Peak Code Domain Error (PCDE) and an Error Vector Magnitude (EVM) from worsening.

As shown in FIG. 1b, a multicarrier signal clipping device 70 adopting a complex coefficient filting includes a noise generation unit 700, an amplitude prediction unit 701, a noise amplitude adjustment unit 702, a complex filtering wideband noise processing unit 703, a peak value counteracting unit 704, a clipping filter selection unit 705, and a subcarrier power detection unit 706. The noise generation unit 700 includes a squarer 7001, a squarer 7002 and a noise generator 7003. The structures and functions of the noise generation unit 700, the amplitude prediction unit 701, the noise amplitude adjustment unit 702, the peak value counteracting unit 704, the clipping filter selection unit 705 and the subcarrier power detection unit 706 are the same as those of corresponding units in the multicarrier signal clipping device 60 adopting the real coefficient filtering.

In accordance with the method corresponding to the device 70, the noise generation unit 700 first receives a multicarrier joint signal and generates a clipped complex noise, then sends the clipped complex noise simultaneously to the amplitude prediction unit 701 and the noise amplitude adjustment unit 702. Then, the subcarrier power detection unit 706 detects the magnitude of each subcarrier power, detects whether the power falls, and further calculates the amplitude of the falling if the power falls. The clipping filter selection unit 705 selects an appropriate clipping filter coefficient according to the power information from the subcarrier power detection unit 706 and sends these selected coefficients to the amplitude prediction unit 701 and the complex wideband noise processing unit 703. The amplitude prediction unit 701 performs a prediction for the amplitude of the clipped complex noise which passes the actual clipping complex filter and then sends the predicted value to the noise amplitude adjustment unit 702. The noise amplitude adjustment unit 702 performs an amplitude adjustment for the clipped noise according to the predicted value to make the peak value of the adjusted signal after being filtered more close to the original clipped complex noise. The complex filtering wideband noise processing unit 703 receives the complex noise signal after being processed with the amplitude adjustment, shapes the spectrum thereof to make the spectrum thereof meet a certain requirement, and then the peak value counteracting unit 704 performs the peak value counteracting of the original multicarrier joint signal.

In order to use a locating method of an Observed Time Difference Of Arrival (OTDOA) in a Wideband Code Division Multiple Access (WCDMA) system, a Third Generation Packet Protocol (3GPP) requires that base stations support an Idle Period in DownLink (IPDL) mechanism. In the IPDL mechanism, each base station will interrupt all the downlink transmitting signals in the base station, including those for a common channel and a dedicated channel, for a rather short duration such as half a slot or one slot, and the interruption is called an IPDL. During the IPDL, a User Equipment (UE) needing to be located in the base station cell measures signals from other base stations. Corresponding network measuring unit such as a Locating/Measuring Unit (LMU) fulfills the measurement of a Reaching Time Difference (RTD), and obtains the differences among the times at which different base station signals reach the UE. Then the UE location may be calculated according to a plurality of the time differences. The 3GPP specifies the base station output power limit during these idle periods in an IPDL time template mode. As shown in FIG. 2, the lowest demands of the IPDL time template are that the measured value of the signal's average power should be no larger than the base station's maximum output power −35 dB during the time period between 27 chips after the IPDL period starts and 27 chips before the IPDL period ends.

However, in the existing multicarrier clipping technology, as object of the bandpass filtering is a wideband signal, the IPDL period is rather short in general, and a starting moment for the IPDL is not fixed. When the IPDL starts in a subcarrier, the clipped signals of other subcarriers will be leaked into the frequency band where the subcarrier starting the IPDL is located so that an extra-large power of the subcarrier signal is generated after being clipped, which is unable to meet demands of the IPDL time template and further affects the locating function of the base stations using the IPDL mechanism.

SUMMARY OF THE INVENTION

Embodiments of the present invention provide a device of multicarrier signal clipping, including:

a subcarrier power detection unit, being configured to detect power of each subcarrier forming a multicarrier joint signal and output a detection result;

a subcarrier Idle Period in DownLink (IPDL) detection unit, being configured to perform an IPDL detection for each subcarrier and output an IPDL flag when an IPDL starts in a subcarrier;

a clipping filter coefficient selection unit, being configured to select a clipping filter coefficient according to the IPDL flag from the subcarrier IPDL detection unit and the detection result from the subcarrier power detection unit and output the clipping filter coefficient;

a multicarrier clipping processing unit, being configured to perform a clipping processing of the received multicarrier joint signal according to the clipping filter coefficient from the clipping filter coefficient selection unit and output the multicarrier joint signal after the clipping processing.

An embodiment of the present invention also proposes a method for clipping multicarrier signal, including:

detecting whether an Idle Period in DownLink (IPDL) starts in each subcarrier forming a multicarrier joint signal, generating an IPDL flag at a time when the IPDL starts in a subcarrier, and detecting power of each subcarrier to obtain a detection result;

selecting a clipping filter coefficient according to the IPDL flag and the detection result;

performing a clipping processing of the received multicarrier joint signal according to the clipping filter coefficient and outputting the multicarrier joint signal after the clipping processing.

From the aforesaid scheme it is observed that embodiments of the present invention adopt an effective subcarrier IPDL detection method and preferably switch the multicarrier clipping filter coefficient for each subcarrier in which the IPDL starts so as to fulfill the demands of the IPDL time template on the premise of that no multicarrier clipping performance is affected, and effectively support the IPDL mechanism in the WCDMA system.

EMBODIMENTS OF THE INVENTION

In order to make the objects, technical schemes and merits of the present invention clearer, a detailed description of embodiments of the present invention is hereinafter given with reference to accompanying drawings.

In order to support the IPDL, embodiments of the present invention detect whether the IPDL starts in each subcarrier based on the prior art, and preferably select a clipping filter coefficient appropriate for the IPDL when detecting that the IPDL starts or ends in a subcarrier so as to effectively eliminate bad effects of the existing multicarrier clipping technology on the IPDL.

Figure 3:
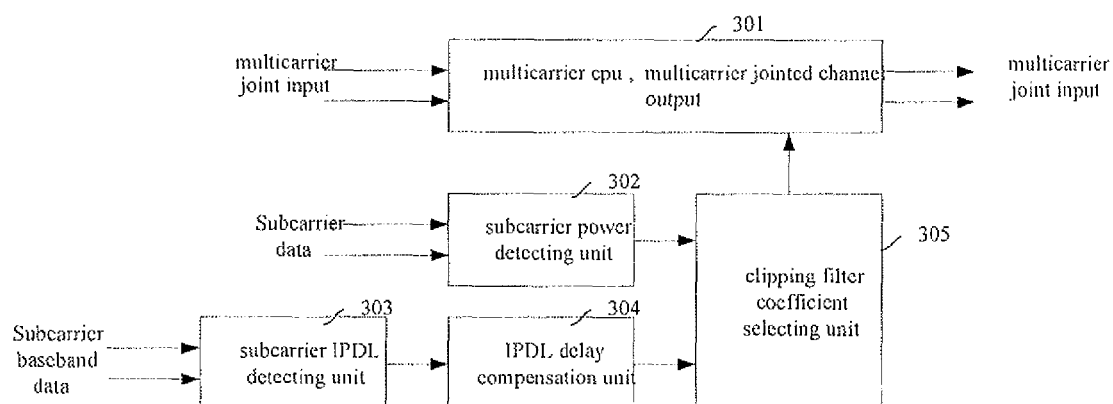
FIG. 3 is a schematic illustrating a multicarrier clipping device in accordance with an embodiment of this invention.

FIG. 3 is a schematic illustrating the principle of a multicarrier clipping device in accordance with an embodiment of the present invention. The multicarrier clipping device includes a multicarrier clipping processing unit 301, a subcarrier power detection unit 302, a subcarrier IPDL detection unit 303, an IPDL delay compensation unit 304 and a clipping filter coefficient selection unit 305. Function of each unit and implementation process thereof are described below, respectively.

Figure 1A:
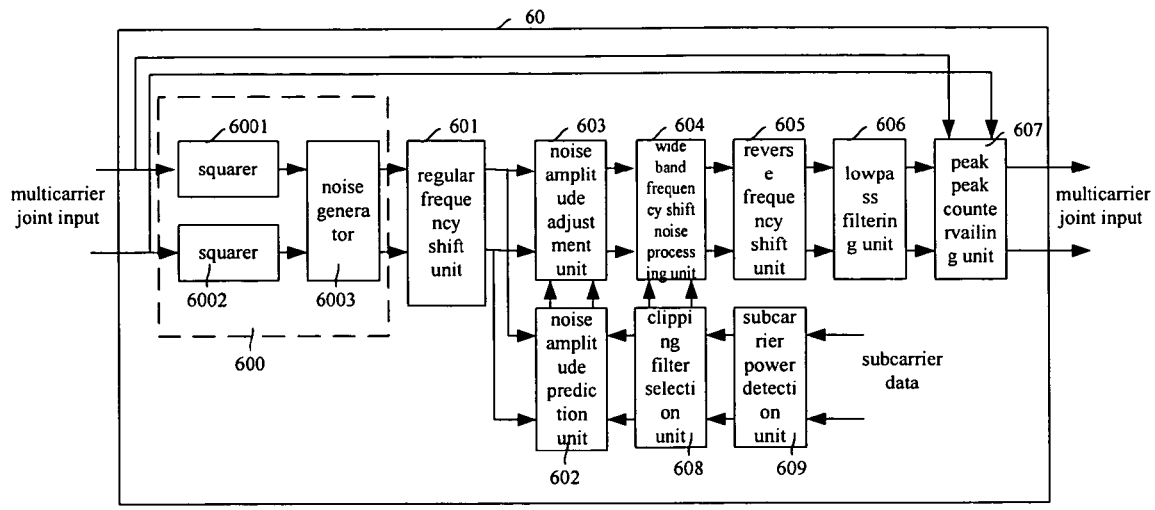
FIG. 1a is a schematic illustrating a multicarrier clipping device with a real coefficient filtering adopted in the prior art.
Figure 1B:
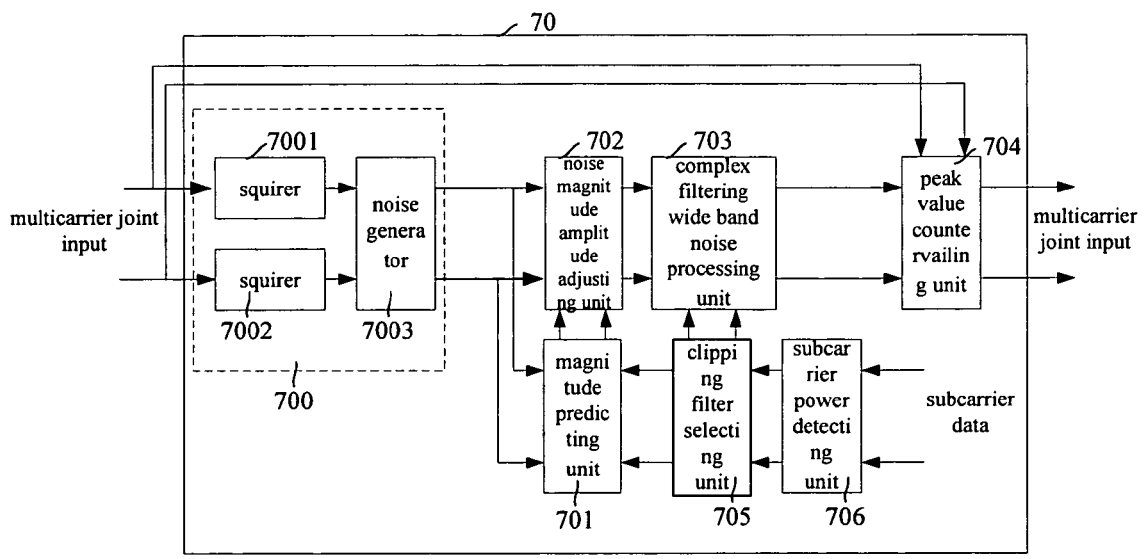
FIG. 1b is a schematic illustrating a multicarrier clipping device with a complex coefficient filtering adopted in the prior art.
Figure 2:
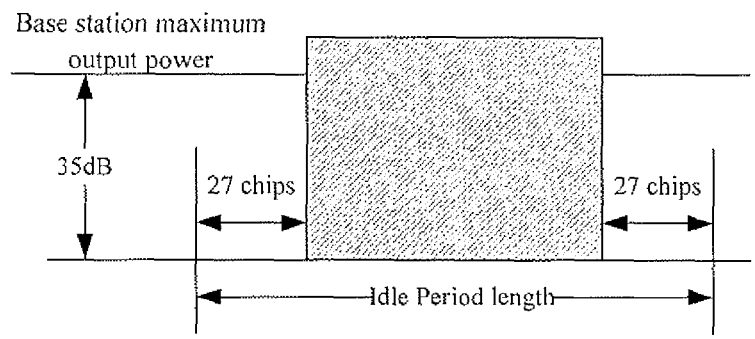
FIG. 2 is a schematic illustrating an IPDL time template in accordance with an embodiment of the present invention.

The multicarrier clipping processing unit 301 is a unit for performing a multicarrier clipping processing based on a multi-band bandpass filter such as the multicarrier clipping device 60 adopting a real coefficient filtering in the prior art shown in FIG. 1a or the multicarrier clipping device 70 adopting a complex coefficient filtering shown in FIG. 1b. Embodiments of the invention are applicable to other multicarrier clipping techniques based on the multi-band bandpass filter and the filter coefficient selection.

The subcarrier power detection unit 302 may be the same as the subcarrier power detection unit 609 in the device 60 of the prior art. The subcarrier power detection unit 302 is used for detecting power of each subcarrier forming the multicarrier joint signal, detecting whether each subcarrier power falls and detecting the falling power level. The subcarrier power detection unit 302 needs to perform a statistic of the power of each subcarrier signal, for example, calculate a power average value in a given statistical window length and periodically compare the statistical value of each subcarrier power with a reference power value to determine whether each subcarrier power falls and determine the level of the power fall in dB. Then, the subcarrier power detection unit 302 puts the detection result including the subcarrier power information into the clipping filter coefficient selection unit 305 to provide necessary information for the switching of the clipping filter coefficient. If the window length for performing a power statistic is not long enough, a detection result will change frequently which will lead to a frequent switching of the clipping filter coefficient. In order to avoid such phenomenon, the window length for the power statistic in the subcarrier power detection unit 302 is usually required to be long enough. In addition, the subcarrier data put into the subcarrier power detection unit 302 may be intermediate frequency data or may be baseband data. A better result will be achieved when the baseband data is used.

The subcarrier IPDL detection unit 303 is used for performing the IPDL detection for subcarrier data and outputting a subcarrier IPDL flag ipdl_flag to the IPDL delay compensation unit 304 when detecting that the IPDL starts in a subcarrier. If value of the subcarrier IPDL flag ipdl_flag is 1, it indicates that the IPDL is in process in a subcarrier. If value of the ipdl_flag is 0, it indicates no IPDL starts or the IPDL ends in the subcarrier.

A subcarrier will become silent completely during the IPDL, and the value of the baseband signal is consecutive zeros. While during non-IPDL, consecutive zeros should not appear because a pilot channel exists. Therefore, in this embodiment, it is determined that an IPDL starts in a subcarrier if power value of the subcarrier is zero within N1 consecutive chips; whereas it is determined that an IPDL ends in a subcarrier if there are N3 chips with non-zero power values in N2 chips. The aforesaid IPDL detection parameters N1, N2 and N3 are positive integers and N2 is larger than N3, which are configured by a Central Processing Unit (CPU) or a Digital Signal Processing (DSP) chip according to characteristics of the IPDL data. The typical values of N1, N2 and N3 are 8, 16 and 4 according to experiences in tests.

Figure 4:
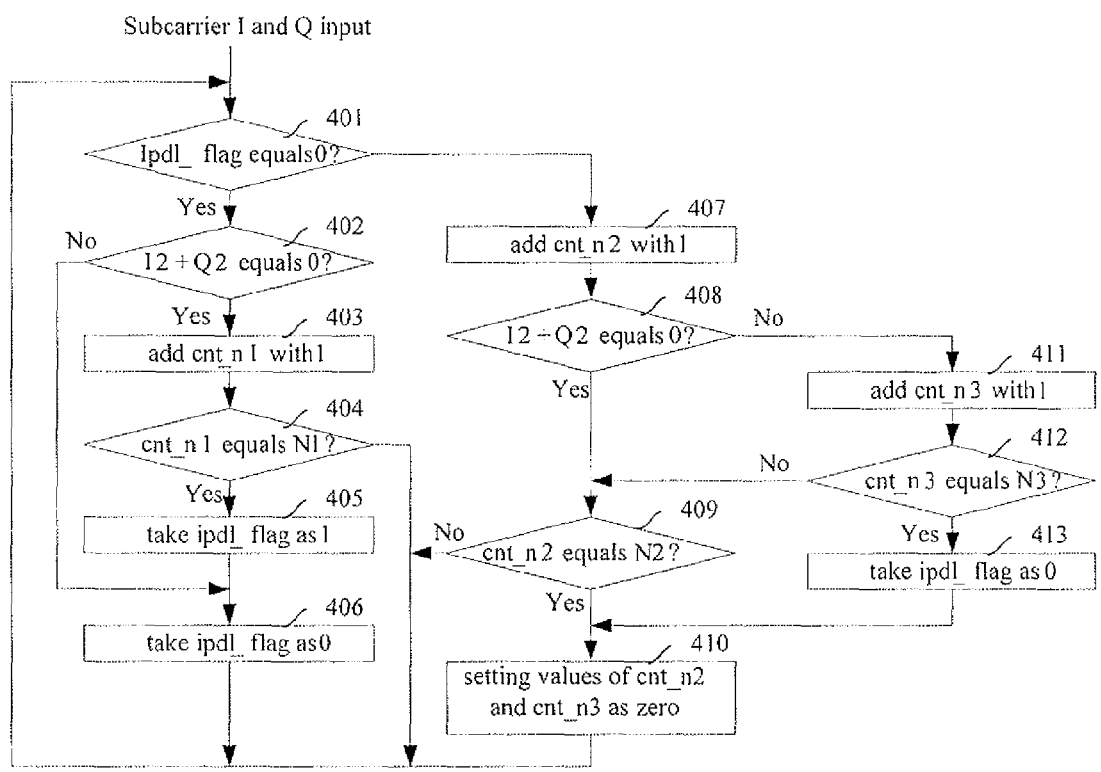
FIG. 4 is a flowchart schematic illustrating a workflow of a subcarrier IPDL detection unit in accordance with an embodiment of this invention.

With reference to FIG. 4, the subcarrier IPDL detection process is as follows.

Step 401, after subcarrier signals of I and Q are inputted, determining whether the ipdl_flag is zero, that is to say, whether the IPDL starts in the subcarrier. If the IPDL starts in the subcarrier, step 402 is performed, otherwise step 407 is performed.

Step 402, according to signals of I and Q, determining whether the power of the subcarrier signal is zero, i.e., whether $I^2+Q^2$=zero, if $I^2+Q^2$=zero, step 403 is performed, otherwise step 406 is performed. $I^2$ and $Q^2$ represent instantaneous power of I channel signal and Q channel signal, respectively.

Step 403, adding 1 to cnt_n1, cnt_n1 represents number of the chips whose subcarrier power is consecutive zero.

Step 404, determining whether value of cnt_n1 is N1, i,e., whether the number of the chips whose subcarrier power is consecutive zero reaches N1, if the number of the chips whose subcarrier power is consecutive zero reaches N1, step 405 is performed, which indicates that the IPDL is in process in the subcarrier, otherwise step 401 is performed to detect next chip.

Step 405, setting value of the ipdl_flag as 1.

Step 406, setting the value of cnt_n1 as zero then performing step 401 to detect next chip.

Step 407, adding 1 to cnt_n2, and the value of cnt_n2 represents the number of the chips accumulatively detected when the chips with non-zero subcarrier power are detected.

Step 408, determining whether $I^2+Q^2$=0, and step 409 is performed if $I^2+Q^2$=0, otherwise step 411 is performed.

Steps 409 to 410, determining whether the value of cnt_n2 is N2, and if the value of cnt_n2 is N2, setting the values of cnt_n2 and cnt_n3 as zero then performing step 401 to detect next chip. If the value of cnt_n2 is not N2, directly performing step 401 to detect next chip. The value of cnt_n3 represents the number of the chips with non-zero subcarrier power.

Steps 411 to 412, after 1 is added to the value of cnt_n3, determining whether the value of cnt_n3 is N3. If the value of cnt_n3 is N3, step 413 is performed, otherwise step 409 is performed.

Step 413, setting the value of the ipdl_flag as 0.

The IPDL delay compensation unit 304 is used for performing a delay compensation for the IPDL flag ipdl_flag of each subcarrier, and after the delay compensation, outputting the IPDL flag ipdl_flag of each subcarrier to the clipping filter coefficient selection unit 305. The reason is that only after passing a series of interpolation filtering, up frequency shift and multicarrier joint modules and the like as required will the subcarrier baseband data be inputted into the multicarrier clipping device, which causes a channel delay including a filter group delay and a processing delay. Therefore, it is necessary to compensate for the delay when the IPDL detection is performed. In addition, the IPDL delay compensation unit is not indispensable. Even if no IPDL delay compensation unit exists, embodiments of the present invention can also be implemented except that the result may not be the best. Supposing the aforesaid subcarrier baseband data's channel delay is D1 clock period, the coefficient switching process delay in the clipping filter coefficient selection unit 305 is D2 clock period, and the multicarrier clipping processing unit 301 works at X times chip speed, then the amount of the compensation is D3=D1−N1×X−D2 clock periods. In the formula above, N1 is an IPDL detection parameter in the subcarrier IPDL detection unit 303, D1 and D2 are determined according to the hardware which generates D1 and D2 and preset in the IPDL delay compensation unit 304.

The clipping filter coefficient selection unit 305 determines whether it is necessary to update the clipping filter coefficient according to the subcarrier power information during a period of time provided by the subcarrier power detection unit 302 and the IPDL flag ipdl_flag provided by the subcarrier IPDL detection unit 303. The clipping filter coefficient selection unit 305 selects an appropriate clipping filter coefficient when the clipping filter coefficient is necessary to be updated, and puts the clipping filter coefficient into the multicarrier clipping processing unit 301.

Different from the clipping filter selection unit 608 in the prior art, a priority processing logic in connection with the IPDL flag ipdl_flag, including an ipdl_flag signal's edge detection and an IPDL clipping filter coefficient selection, is incorporated into the clipping filter coefficient selection unit 305. When a subcarrier ipdl_flag signal's rising edge is detected, it indicates that the IPDL starts in the subcarrier, then corresponding IPDL clipping filter coefficient is selected. When a subcarrier ipdl_flag signal's falling edge is detected, it indicates that the IPDL in the subcarrier has ended, then an appropriate IPDL clipping filter coefficient according to the falling status of each subcarrier's power is selected. When the IPDL starts in a subcarrier, in corresponding IPDL clipping filter frequency response, the frequency band occupied by the subcarrier is a block band and meets certain demands of suppression.

Figure 5:
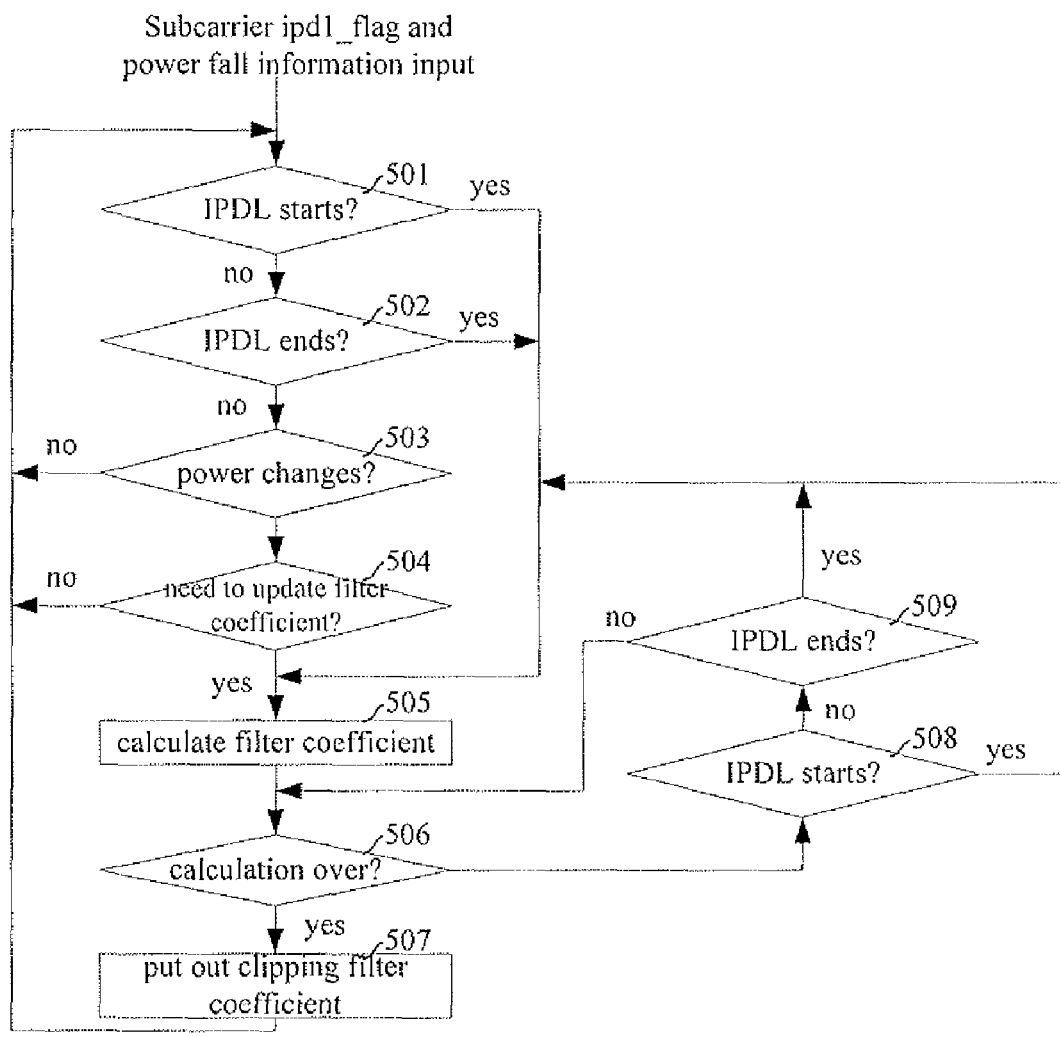
FIG. 5 is a flowchart schematic illustrating a workflow of a clipping filter coefficient selection unit in accordance with an embodiment of this invention.

With reference to FIG. 5, the procedure for processing in the clipping filter coefficient selection unit 305 in accordance with an embodiment is as follows:

Step 501, determining whether an IPDL starts according to the inputted ipdl_flag signal, i.e., whether a subcarrier ipdl_flag signal's rising edge is detected, if a subcarrier ipdl_flag signal's rising edge is detected, step 505 is performed, otherwise 502 is performed.

Step 502, determining whether an IPDL ends according to the aforesaid ipdl_flag signal, i.e., whether a subcarrier ipdl_flag signal's falling edge is detected, if a subcarrier ipdl_flag signal's falling edge is detected, step 505 is performed, otherwise step 503 is performed.

Step 503, determining whether each subcarrier's power changes according to the detection result inputted from the subcarrier power detection unit 302, if one subcarrier's power changes, step 504 is performed, otherwise step 501 is performed to perform the processing in a next round.

Step 504, determining whether it is necessary to update the clipping filter coefficient according to the detection result inputted from the subcarrier power detection unit 302, i.e., according to the subcarrier power information such as whether the subcarrier's power falls as well as the falling level and the like, if it is determined to update the clipping filter coefficient, step 505 is performed, otherwise step 501 is performed to make processing in the next round. There are a variety of methods to determine whether it is necessary to update the clipping filter coefficient, and the simplest one is that: determining whether the power falling level in the detection result changes, if the power falling level in the detection result changes, it is necessary to update the clipping filter coefficient, otherwise no updating is needed.

Step 505, calculating the clipping filter coefficient according to the detection result inputted from the subcarrier power detection unit 302. There are also a variety of methods of calculation in this step and a rather concise one is given in this embodiment. According to this method, getting a variety of combinations in advance according to the status how the IPDL starts in the subcarrier and the power level, determining the clipping filter coefficient corresponding to each combination and saving corresponding relationship between each combination and the clipping filter coefficient. In the calculation of this step, getting a combination according to the IPDL flag ipdl_flag provided by the subcarrier IPDL detection unit 303 and the detection result provided by the subcarrier power detection unit 302, and then getting corresponding clipping filter coefficient according to the combination and the aforesaid corresponding relationship. The actual calculation needs a plurality of or sometimes even a hundred or so clock periods.

Steps 506 to 507, determining whether the aforesaid calculation is over, if the aforesaid calculation is over, outputting the calculated clipping filter coefficient to the multicarrier clipping processing unit 301; otherwise, step 508 is performed.

Steps 508 to 509, determining whether there is an IPDL starts according to the value of the ipdl_flag, if there is an IPDL starts, step 505 is performed. Otherwise determining whether there is an IPDL ends, if there is an IPDL ends, step 505 is performed, otherwise step 506 is performed.

In the method provided by embodiments of the present invention, which corresponds to the aforesaid multicarrier clipping device, the subcarrier IPDL detection unit 303 first performs an IPDL detection according to the received subcarrier baseband data, and sends an IPDL flag ipdl_flag signal to the IPDL delay compensation unit 304. After compensating for each subcarrier's IPDL flag ipdl_flag, the IPDL delay compensation unit 304 inputs the ipdl_flag signal into the clipping filter coefficient selection unit 305.

Meanwhile, the subcarrier power detection unit 302 detects whether each subcarrier's power falls as well as the falling level, and inputs the result information into the clipping filter coefficient selection unit 305.

Then, the clipping filter coefficient selection unit 305 determines whether it is necessary to update the clipping filter coefficient according to the aforesaid ipdl_flag signal and the subcarrier power information provided by the subcarrier power detection unit 302. If the clipping filter coefficient needs to be updated, figuring out a new clipping filter coefficient, and inputting the new clipping filter coefficient to the multicarrier clipping processing unit 301.

Eventually, the multicarrier clipping processing unit 301 performs a clipping processing of the received multicarrier joint signal according to the clipping filter coefficient outputted by the clipping filter coefficient selection unit, and outputs the multicarrier joint signal after clipping. Embodiments of the present invention adopt an effective subcarrier IPDL detection method and preferably switch the multicarrier clipping filter coefficient for each subcarrier in which the IPDL starts so as to fulfill the demands of the IPDL time template on the premise of that no multicarrier clipping performance is affected, and effectively support the IPDL mechanism in the WCDMA system.

The foregoing descriptions are only preferred embodiments of this invention and are not used for limiting this invention, any modification, equivalent replacement or improvement made under the spirit and principles of this invention is included in the protection scope of this invention.

The invention claimed is:

1. A device for clipping multicarrier signal, comprising:
   a subcarrier power detection unit configured to detect power of each subcarrier forming a multicarrier joint signal and output a detection result;
   a subcarrier Idle Period in DownLink (IPDL) detection unit configured to perform an IPDL detection for each subcarrier and output an IPDL flag when an IPDL starts in a subcarrier;
   a clipping filter coefficient selection unit configured to select a clipping filter coefficient according to the IPDL flag from the subcarrier IPDL detection unit and the detection result from the subcarrier power detection unit and output the clipping filter coefficient;
   a multicarrier clipping processing unit configured to perform a clipping processing of the received multicarrier joint signal according to the clipping filter coefficient from the clipping filter coefficient selection unit and output the multicarrier joint signal after the clipping processing; and
   an IPDL delay compensation unit configured to perform a delay compensation for the IPDL flag outputted by the subcarrier IPDL detection unit and output the IPDL flag after the delay compensation to the clipping filter coefficient selection unit,
   wherein the clipping filter coefficient selection unit selects the clipping filter coefficient according to the IPDL flag after the delay compensation and the detection result from the subcarrier power detection unit; and
   wherein amount of the delay compensation in the IPDL delay compensation unit equals to amount of a channel delay of the subcarrier baseband data minus both amounts of a delay produced by performing the IPDL detection for the subcarrier and of a delay produced by performing the selection of the clipping filter coefficient.

2. The device according to claim 1, wherein the multicarrier clipping processing unit is a multicarrier clipping device adopting a real coefficient filtering or a multicarrier clipping device adopting a complex coefficient filtering.

3. The device according to claim 1, wherein data detected by the subcarrier power detection unit is a subcarrier's intermediate frequency data or baseband data.

4. A method for clipping multicarrier signal, comprising:
   detecting whether an Idle Period in DownLink (IPDL) starts in each subcarrier forming a multicarrier joint signal, generating an IPDL flag at a time when the IPDL starts in a subcarrier, and detecting power of each subcarrier to obtain a detection result;

selecting a clipping filter coefficient according to the IPDL flag and the detection result;

performing a clipping processing of the received multicarrier joint signal according to the clipping filter coefficient and outputting the multicarrier joint signal after the clipping processing;

after generating the IPDL flag, performing a delay compensation for the IPDL flag; and selecting the clipping filter coefficient according to the IPDL flag after the delay compensation and the detection result, wherein amount of the delay compensation for the IPDL flag comprises:

amount of a channel delay of the subcarrier baseband data minus a delay amount generated when detecting whether an IPDL starts in a subcarrier and a delay amount generated when selecting the clipping filter coefficient.

5. The method according to claim 4, wherein the process for detecting whether an IPDL starts in each subcarrier forming a multicarrier joint signal comprises:

determining that the IPDL starts in a subcarrier if subcarrier power is zero in consecutive N1 chips; and wherein N1 is a positive integer.

6. The method according to claim 4, further comprising:

saving in advance a corresponding relationship between the IPDL flag as well as the detection result and the clipping filter coefficient; and the step for selecting a clipping filter coefficient comprising:

selecting the clipping filter coefficient according to both the IPDL flag as well as the detection result and the corresponding relationship.

7. The method according to claim 4, further comprising:

determining whether it is necessary to update the clipping filter coefficient, if it is necessary to update the clipping filter coefficient, selecting a new clipping filter coefficient according to the IPDL flag and the detection result;

if the clipping filter coefficient need not be updated, performing the clipping processing of the received multicarrier joint signal according to the clipping filter coefficient and outputting the multicarrier joint signal after the clipping processing.

8. The method according to claim 4, wherein before selecting a clipping filter coefficient, the method further comprises:

detecting a rising edge and/or a falling edge of the IPDL flag.

* * * * *